US011648627B2

(12) United States Patent
Zhang et al.

(10) Patent No.: US 11,648,627 B2
(45) Date of Patent: May 16, 2023

(54) TOUCH DISPLAY DEVICE AND FORMATION METHOD THEREOF

(71) Applicant: TPK Advanced Solutions Inc., Fujian (CN)

(72) Inventors: Yu Zhang, Xiamen (CN); Chen Hsin Chang, Taoyuan (TW); Liang Zhen Xu, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/329,445

(22) Filed: May 25, 2021

(65) Prior Publication Data
US 2022/0379406 A1 Dec. 1, 2022

(51) Int. Cl.
*G06F 3/041* (2006.01)
*B23K 26/362* (2014.01)

(52) U.S. Cl.
CPC ............ *B23K 26/362* (2013.01); *G06F 3/041* (2013.01); *G06F 2203/04103* (2013.01)

(58) Field of Classification Search
CPC ........................ G06F 3/041; G06F 2203/04103
See application file for complete search history.

(56) References Cited

U.S. PATENT DOCUMENTS

| | | | | |
|---|---|---|---|---|
| 2013/0168220 A1* | 7/2013 | Ho | ........................ | G06F 3/0446 200/600 |
| 2013/0307826 A1* | 11/2013 | Ma | ........................ | G06F 3/041 345/175 |
| 2014/0063373 A1* | 3/2014 | Wu | ...................... | G02F 1/13338 349/12 |

(Continued)

FOREIGN PATENT DOCUMENTS

| CN | 105073334 B | 11/2015 |
|---|---|---|
| TW | I521417 B | 2/2016 |

(Continued)

OTHER PUBLICATIONS

Selectively UV-blocking and visibly transparent Adhesive Films Embedded with TiO2/PMMA Hybrid Nanoparticles for Display; Materials 2020, 13, 5273, Nov. 2020.*

*Primary Examiner* — Md Saiful A Siddiqui
(74) *Attorney, Agent, or Firm* — Cooper Legal Group, LLC

(57) ABSTRACT

A touch display device is provided in some embodiments of the present disclosure, including a transparent cover, a patterned touch sensing film layer, a light-shielding layer, and a UV-blocking layer. The patterned touch sensing film layer covers a first surface of the transparent cover. The light-shielding layer is located between the transparent cover and the patterned touch sensing film layer. The UV-blocking layer prevents UV from irradiating the light-shielding layer. The UV-blocking layer is located between the light-shielding layer and the patterned touch sensing film layer and covers the light-shielding layer. A method of forming a touch display device is also provided. The touch display device and formation method thereof provided in some embodiments avoid the injury of the light-shielding layer caused by the laser by disposing of the UV-blocking layer in the single-side electrode structure, which replaces the wet etching steps and decreases the cost of the etching steps.

18 Claims, 21 Drawing Sheets

(56) References Cited

U.S. PATENT DOCUMENTS

| | | | | |
|---|---|---|---|---|
| 2015/0000962 A1* | 1/2015 | Gao | .................. | H05K 1/09 |
| | | | | 174/253 |
| 2015/0060125 A1* | 3/2015 | Stevenson | ............. | G06F 3/0446 |
| | | | | 174/261 |
| 2015/0293646 A1* | 10/2015 | Chen | .................. | G06F 3/0446 |
| | | | | 345/175 |
| 2016/0154527 A1* | 6/2016 | Jiang | .................. | G06F 3/041 |
| | | | | 345/173 |
| 2017/0168616 A1* | 6/2017 | Feng | .................. | G06F 3/0412 |
| 2017/0177127 A1* | 6/2017 | Du | .................. | G06F 3/0412 |
| 2021/0357049 A1* | 11/2021 | Hu | .................. | G06F 3/0412 |

FOREIGN PATENT DOCUMENTS

| | | | |
|---|---|---|---|
| WO | WO 2013/127318 | * | 9/2013 |
| WO | WO 2013/127318 A1 * | | 9/2013 |

\* cited by examiner

TOUCH DISPLAY DEVICE AND FORMATION METHOD THEREOF

BACKGROUND

Field of Disclosure

The present disclosure relates to a touch display device and a formation method thereof.

Description of Related Art

With the vigorous development of touch display device technology in recent years, touch display devices have been widely used in various kinds of electronic devices. The electrode circuit is mainly formed by using a photolithography process, and then the electrode circuit is patterned through a wet etching process.

However, during the wet etching process, a large number of photomasks are required, and a variety of reaction solvents (such as developing solutions, etching solutions, etc.) are necessary. The steps are complicated, the cost is high, and the related art needs to be improved.

Patent No. TW 1521417B teaches that in a double-side electrode structure, a transparent blocking layer can be disposed on a first surface of a transparent substrate, and then a conductive film is formed on the transparent blocking layer and the other surface of the transparent substrate. The disposition of the transparent blocking layer can prevent the conductive film on the other surface from being damaged when the conductive film on either surface is etched by laser.

Patent No. CN 105073334B teaches to adjust the laser pulse length and wavelength within appropriate ranges so that the conductive material can absorb energy of laser, thus avoiding damage to the electrode circuit when the electrode circuit is formed by laser-etching the conductive material.

For the foregoing reasons, there is a need to prevent the laser from damaging elements in a single-side electrode structure by providing a touch display device and a formation method thereof suitable for the single-side electrode structure, which can replace a wet-etched electrode circuit by a laser-etched electrode circuit and do not have the necessity of limiting a length and a wavelength of a laser pulse.

SUMMARY

A touch display device is provided in some embodiments of the present disclosure. The touch display device includes a transparent cover, a patterned touch sensing film layer, a light-shielding layer, and an UV-blocking layer. The transparent cover includes a first surface and a second surface opposite to the first surface. The patterned touch sensing film layer covers the first surface of the transparent cover. The light-shielding layer is disposed on a portion of the first surface of the transparent cover and is located between the transparent cover and the patterned touch sensing film layer. An area projected by the light-shielding layer on the transparent cover along a vertical direction defines a peripheral area, and another area on the transparent cover adjacent to the peripheral area is defined as a visible area. The UV-blocking layer prevents ultraviolet light from irradiating the light-shielding layer. The UV-blocking layer is located between the light-shielding layer and the patterned touch sensing film layer and covers the light-shielding layer.

In some embodiments, a material of the UV-blocking layer is an ink or a photoresist.

In some embodiments, the UV-blocking layer covers the light-shielding layer and extends to cover the first surface in the visible area, and the UV-blocking layer is a transparent material.

In some embodiments, the UV-blocking layer only covers the light-shielding layer.

In some embodiments, the touch display device further includes a peripheral wiring disposed on the patterned touch sensing film layer. A position projected by the peripheral wiring on the transparent cover along the vertical direction is located in the peripheral area.

In some embodiments, the touch display device further includes a transparent insulating layer. A first portion of the transparent insulating layer is disposed on the peripheral wiring, and a second portion of the transparent insulating layer is disposed on the patterned touch sensing film layer in the visible area.

In some embodiments, the touch display device further includes a jumper disposed on the second portion of the transparent insulating layer.

In some embodiments, the touch display device further includes a jumper disposed on the transparent cover in the visible area, and the UV-blocking layer covers the jumper. The UV-blocking layer is a transparent insulating layer.

In some embodiments, the patterned touch sensing film layer covers the UV-blocking layer and extends to cover the portion of the first surface to separate the UV-blocking layer on the jumper and the UV-blocking layer on the light-shielding layer.

In some embodiments, the touch display device further includes a peripheral wiring disposed on the patterned touch sensing film layer. A position projected by the peripheral wiring on the transparent cover along the vertical direction is located in the peripheral area.

In some embodiments, the touch display device further includes a protective layer disposed on the patterned touch sensing film layer.

A method of forming a touch display device is provided in some embodiments of the present disclosure. The method includes: providing a transparent cover comprising a first surface and a second surface opposite to the first surface; covering a light-shielding layer on a portion of the first surface of the transparent cover, in which an area projected by the light-shielding layer on the transparent cover along a vertical direction defines a peripheral area, and another area on the transparent cover adjacent to the peripheral area is defined as a visible area; covering an UV-blocking layer on the light-shielding layer; forming a touch sensing film layer on the UV-blocking layer; and using a laser to etch the touch sensing film layer into a patterned touch sensing film layer.

In some embodiments, the UV-blocking layer covers the light-shielding layer and extends to cover the first surface in the visible area in the step of covering the UV-blocking layer on the light-shielding layer, and the UV-blocking layer is a transparent material.

In some embodiments, the UV-blocking layer only covers the light-shielding layer in the step of covering the UV-blocking layer on the light-shielding layer.

In some embodiments, the method further includes disposing a jumper on the transparent cover in the visible area after the step of covering the light-shielding layer on the portion of the first surface of the transparent cover; and the method further includes covering the jumper by the UV-blocking layer in the step of covering the UV-blocking layer on the light-shielding layer, in which the UV-blocking layer is a transparent insulation material.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1A:
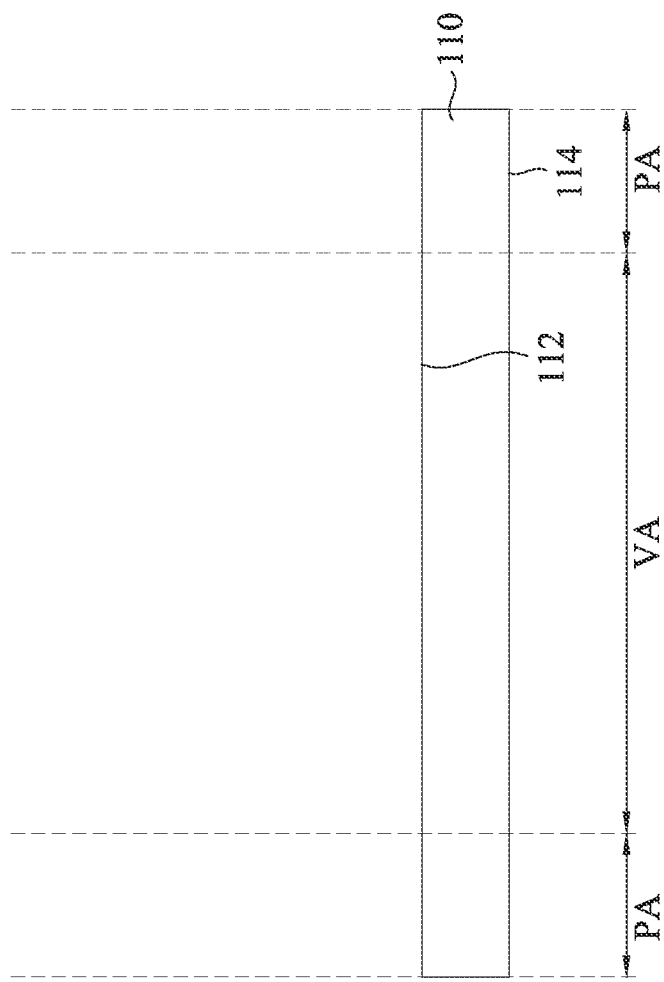
FIG. 1A to FIG. 1H schematically depict cross-sectional diagrams of forming a touch display device at various process stages according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. Any examples of the use of the term discussed herein included in the description of the present specification are merely for illustrative purposes and are not intended to limit the scope and meaning of the present disclosure or any exemplary term. Similarly, the present disclosure is not limited to the various embodiments described in this specification.

Further, spatially relative terms, such as "beneath," "below," "lower," "above," "upper", and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

As used herein, the singular forms "a", "an", and "the" are intended to include the plural forms as well, unless the context clearly indicates otherwise. It will be further understood that the terms "comprises" and/or "comprising", or "includes" and/or "including", or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," etc., may be used herein to describe various elements, these elements should not be limited by these terms. These terms are used to distinguish one element from another. For example, a first element could be termed a second element, and similarly, a second element could be termed a first element, without departing from the scope of the embodiments.

It will be understood that, as used herein, the term "and/or" includes any and ail combinations of one or more of the associated listed items.

Reference will now be made in detail to the present embodiments of the disclosure, examples of which are illustrated in the accompanying drawings. Wherever possible, the same reference numbers are used in the drawings and the description to refer to the same or like parts.

FIG. 1A to FIG. 1H schematically depict cross-sectional diagrams of forming a touch display device 100 at various process stages according to some embodiments of the present disclosure.

Please refer to FIG. 1A. First, a transparent cover 110 is provided. The transparent cover 110 includes a first surface 112 and a second surface 114 opposite to the first surface 112.

In some embodiments, the transparent cover 110 may be a transparent inorganic substrate (such as a glass substrate) or a transparent organic substrate. The transparent organic substrate may be a plastic substrate, such as a transparent material including poly(methylmethacrylate) (PMMA), polyethylene (PE), polyvinyl chloride (PVC), polypropylene (PP), polyethylene terephthalate (PET), polyethylene naphthalate (PEN), polycarbonate (PC), polystyrene (PS), polyimide (PI), a cyclo-olefin polymer (COP), etc.

In some embodiments, a thickness of the transparent cover 110 is less than 2 millimeters (mm), for example, from 0.3 mm to 1.1 mm. For example, the thickness of the transparent cover 110 may be 0.3 mm, 0.4 mm, 0.5 mm, 0.6 mm, 0.7 mm, 0.8 mm, 0.9 mm, 1.0 mm, or 1.1 mm.

Figure 1B:
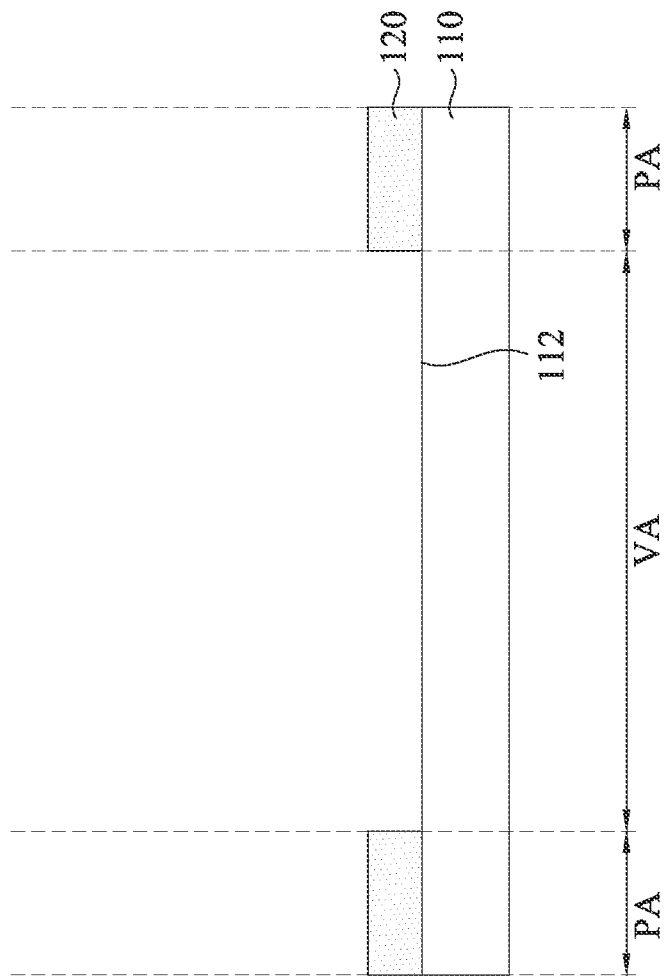

Please refer to FIG. 1B. A light-shielding layer 120 is then disposed on a portion of the first surface 112 of the transparent cover 110. An area projected by the light-shielding layer 120 on the transparent cover 110 along the Z-axis direction (a vertical direction) defines a peripheral area PA, and another area on the transparent cover 110 adjacent to the peripheral area PA is defined as a visible area VA. In some embodiments, the light-shielding layer 120 may be formed by coating or printing opaque ink (for example, black ink, white ink, etc.), or may be an opaque photoresist.

In some embodiments, a thickness of the light-shielding layer 120 is less than 30 micrometers ($\mu$m), for example, from 1 $\mu$m to 20 $\mu$m. For example, the thickness of the light-shielding layer 120 may be 1 $\mu$m, 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, 11 $\mu$m, 12 $\mu$m, 13

μm, 14 μm, 15 μm, 16 μm, 17 μm, 18 μm, 19 μm, 20 μm, or a value within any interval defined by the above values.

Figure 1C:
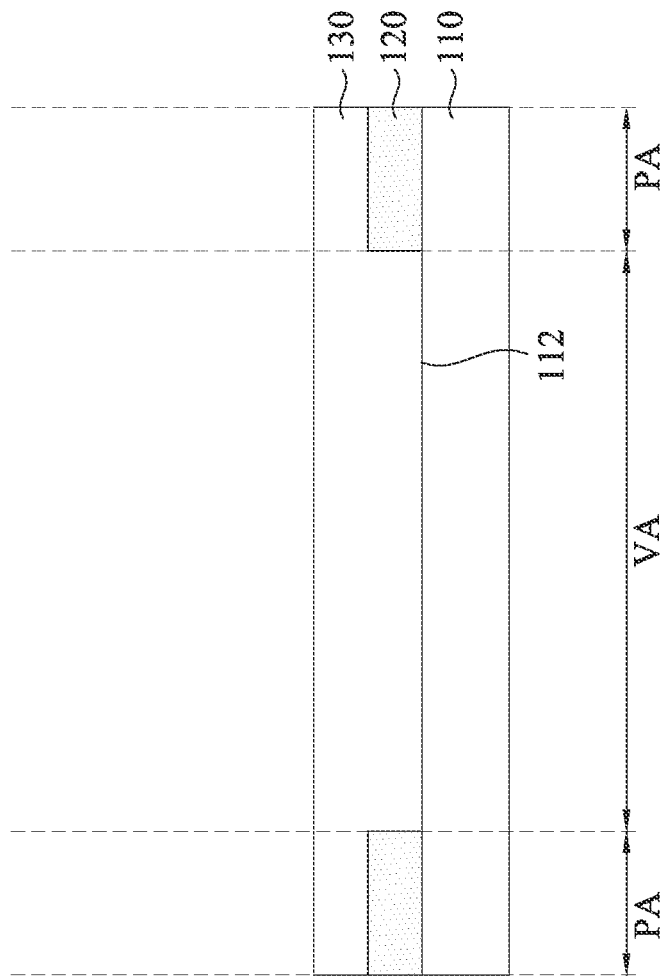

Please refer to FIG. 1C. An ultraviolet-blocking (UV-blocking) layer 130 is then covered on the light-shielding layer 120 and extends to the first surface 112 in the visible area VA. That is to say, a position projected by the UV-blocking layer 130 on the transparent cover 110 along the Z-axis direction (the vertical direction) covers the light-shielding layer 120 and the first surface 112 of the transparent cover 110. It is noted that the UV-blocking layer 130 needs to be a transparent material, and the UV-blocking layer 130 can block ultraviolet light (wavelength is from 355 nm to 365 nm) to prevent ultraviolet light from damaging elements covered by the UV-blocking layer 130 (for example, the light-shielding layer 120). In some embodiments, the UV-blocking layer 130 can block more than 90% of ultraviolet light, such as 91%, 92%, 93%, 94%, 95%, 96%, 97%, 98%, 99%, or 100% of ultraviolet light. In some embodiments, the UV-blocking layer 130 may be formed by coating or printing a transparent ink or a transparent photoresist (for example, polyimide).

In some embodiments, the UV-blocking layer 130 may completely cover the first surface 112 in the visible area VA or may partially cover the first surface 112 in the visible area VA.

In some embodiments, a thickness of the UV-blocking layer 130 is less than 30 μm, for example, from 0.1 μm to 8 μm. For example, the thickness of the UV-blocking layer 130 may be 0.1 μm, 0.2 μm, 0.3 μm, 0.4 μm, 0.5 μm, 0.6 μm, 0.7 μm, 0.8 μm, 0.9 μm, 1 μm, 2 μm, 3 μm, 4 μm, 5 μm, 6 μm, 7 μm, 8 μm, or a value within any interval defined by the above values.

Figure 1D:
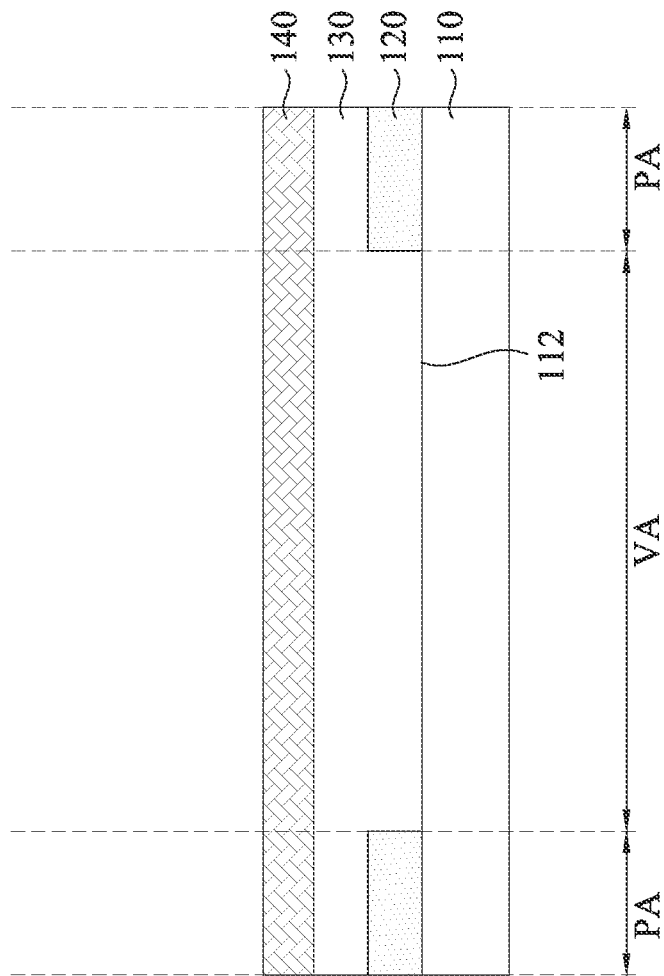

Please refer to FIG. 1D. Next, a patterned touch sensing film layer 140 is formed on the UV-blocking layer 130. In some embodiments, the steps of forming the patterned touch sensing film layer 140 on the UV-blocking layer 130 are first printing or coating a touch sensing film layer (e.g., using a process such as screen printing, nozzle coating, roller coating, etc.) on the UV-blocking layer 130; the touch sensing film layer thereafter being etched into the patterned touch sensing film layer 140 by using an ultraviolet laser having a wavelength of 355 nm to 365 nm. In some embodiments, the touch sensing film layer is made of a transparent conductive material, such as indium tin oxide (ITO), indium zinc oxide (IZO), a carbon nanotube (CNT), nano silver, and the like.

In some embodiments, the patterned touch sensing film layer 140 includes metal nanowires made of a transparent conductive material. A detailed method of forming the touch sensing film layer made of metal nanowires is described as follows. The method includes: coating a dispersion or an ink having metal nanowires on the UV-blocking layer 130 and drying the dispersion to form the touch sensing film layer. After substances, including solvent, etc., in the dispersion or slurry are volatilized, the metal nanowires are randomly distributed and fixed to a surface of the UV-blocking layer 130 to form the touch sensing film layer, and the metal nanowires are in contact with one another. A continuous current path is provided to further form a conductive network. In some embodiments, the dispersion may be water, alcohol, ketone, ether, hydrocarbon, or an aromatic solvent (benzene, toluene, xylene, etc.). In one embodiment, the dispersion may include an additive, a surfactant, or a binder, such as carboxymethyl cellulose (CMC), hydroxyethyl cellulose (HEC), hydroxypropyl methylcellulose (HPMC), ester of sulfonic acid, ester of sulfuric acid, disulfonate, sulfosuccinate, phosphoric ester, a fluorine-containing interfacial agent, etc.

It is noted that, as used herein, "metal nanowires" is a collective term that refers to a collection of metal wires including multiple metal elements, metal alloys, or metal compounds (including metal oxides). Additionally, at least one cross-sectional dimension (that is, a diameter of a cross section) of a single metal nanowire is less than about 500 nanometers (nm), preferably less than about 100 nm, and more preferably less than about 50 nm. In some embodiments, the "wire" metal nanostructure mainly has a high aspect ratio, for example, between about 10 and 100,000. In greater detail, the aspect ratio (length:diameter of the cross section) of the metal nanowire may be greater than about 10, for example, greater than about 50, or greater than about 100. However, the present disclosure is not limited in this regard. In some embodiments, the metal nanowire may be any metal, including (but not limited to) silver, gold, copper, nickel, or gold-plated silver. Other terms, such as silk, fiber, tube, etc., are also within the scope of the embodiments of the present disclosure if they similarly have the above dimension and high aspect ratio.

In some embodiments, a thickness of the patterned touch sensing film layer 140 is less than 3 μm, for example, from 0.1 μm to 1 μm. For example, the thickness of the patterned touch sensing film may be 0.1 μm, 0.2 μm, 0.3 μm, 0.4 μm, 0.5 μm, 0.6 μm, 0.7 μm, 0.8 μm, 0.9 μm, or 1.0 μm.

Figure 1E:
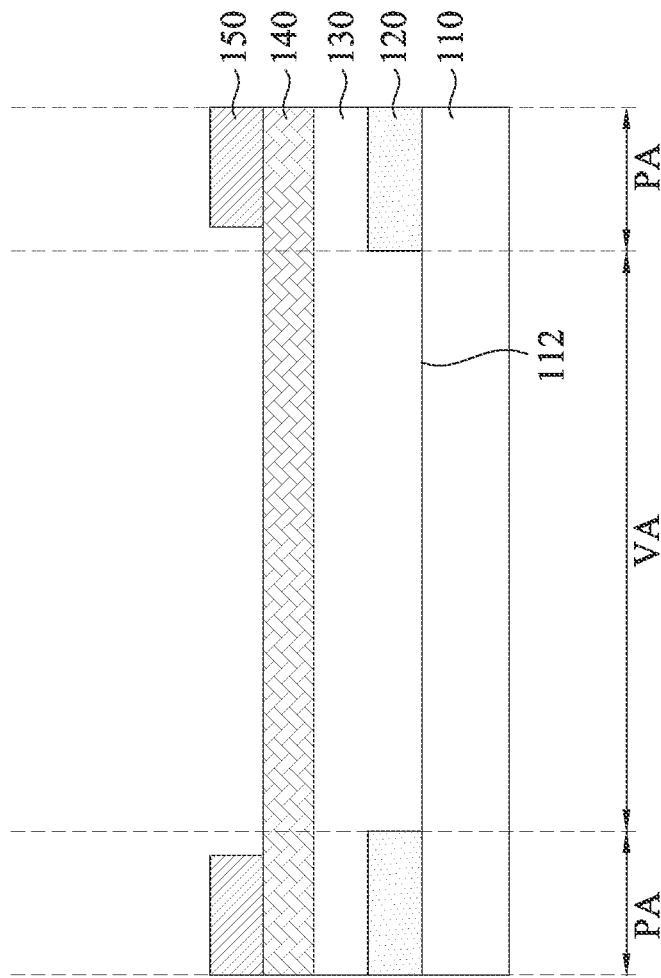

Please refer to FIG. 1E. A peripheral wiring 150 is then formed on the patterned touch sensing film layer 140 in the peripheral area PA. That is, a position projected by the peripheral wiring 150 on the transparent cover 110 along the Z-axis direction (the vertical direction) is located in the peripheral area PA.

In some embodiments, a material or a formation method (e.g., a process such as screen printing, nozzle coating, roller coating, etc.) similar to the material or the formation method of the patterned touch sensing film layer 140 may be used to form the peripheral wiring 150.

In some embodiments, a peripheral wiring layer can be formed by electroless plating and catalyzed by a catalytic layer, and then the peripheral wiring layer is lasered to become the peripheral wiring 150. In greater detail, the catalytic layer is first formed on the patterned touch sensing film layer 140 in the peripheral area PA. After that, in the absence of an external current, a plating solution is applied to the catalytic layer with the help of a suitable reducing agent, so that metal ions in the plating solution undergo a reduction reaction under the catalysis of a metal catalyst of the catalytic layer to be reduced to metal and plated (also called deposited) on a surface of the catalytic layer. This process is also called electroless plating or autocatalytic plating. For example, if it is intended to use copper to form the peripheral wiring 150, the main component of the plating solution can be copper sulfate solution. A composition of the plating solution may include but is not limited to: copper sulfate with a concentration of 5 g/L, ethylenediaminetetraacetic acid with a concentration of 12 g/L, and formaldehyde with a concentration of 5 g/L. The pH of the plating solution (e.g., the copper sulfate solution) is adjusted to about 11 to 13 with sodium hydroxide, the plating bath temperature is about 30° C. to 50° C., and the immersion reaction time is 5 to 15 minutes. During the reaction process, the copper in the plating solution can nucleate on the catalytic layer with catalytic/activation ability and then continue to grow into a copper film (that is, the peripheral wiring 150) by the self-catalysis of copper. Those skilled in the art can choose the appropriate plating solution and material of the catalytic layer depending on the material of the peripheral wiring 150 intended to be obtained. In some embodiments, the peripheral wiring 150 is made of a metal with better conductivity, for example: a single-layer metal structure, such as a silver layer, a copper layer, etc., or a conductive structure in a form of a multilayer alloy, such as molybdenum/aluminum/molybdenum, copper/nickel, titanium/aluminum/titanium, molybdenum/chromium, etc. In another embodiment, in order to increase a thickness of the peripheral wiring 150, a thickening step may be added, such as an electroplating process. The composition of an electroplating solution used in the electroplating process may include but is not limited to: copper sulfate with a concentration of 200 g/L, sulfuric acid with a concentration of 80 g/L, and chloride ions with a concentration of 50 mg/L. The pH is adjusted to about 3 to 5, the current density is about 1 to 10 A/dm$^2$, and the plating bath temperature is about 25 to 45° C. The sequence of the electroless plating process and the electroplating process mentioned above can be adjusted depending on practical needs, and the present disclosure is not limited in this regard. For example, the electroplating process can be performed first and then followed by the electroless plating process, or the electroless plating process can be performed first and then followed by the electroplating process. Of course, it is also possible to only use electroplating processes or electroless plating processes. In other embodiments, the thickening step may be another electroless plating process, for example, an electroless copper plating process is performed by using another plating solution whose composition is different from the above plating solution to increase the thickness of the peripheral wiring 150.

In some embodiments, the touch sensing film layer and the peripheral wiring layer can be formed sequentially, and then the patterned touch sensing film layer 140 and the peripheral wiring 150 are formed by laser-etching at the same time.

In some embodiments, a thickness of the peripheral wiring 150 is less than 20 μm, for example, from 0.01 μm to 1.1 μm. For example, the thickness of the peripheral wiring 150 is less may be 0.01 μm, 0.05 μm, 0.1 μm, 0.2 μm, 0.3 μm, 0.4 μm, 0.5 μm, 0.6 μm, 0.7 μm, 0.8 μm, 0.9 μm, 1.0 μm, or 1.1 μm.

It is noted that through covering the UV-blocking layer 130 on the light-shielding layer 120, the damages to the light-shielding layer 120 caused by the ultraviolet light can be avoided when the patterned touch sensing film layer 140 (and the peripheral wiring 150) is formed by laser-etching. The problem of damaging the light-shielding layer 120 when the electrode circuit (e.g., the patterned touch sensing film layer 140) is laser-etched is thus resolved. As a result, through the disposition of the UV-blocking layer 130, the step improvement of replacing the wet etching with laser-etching in the single-side electrode structure can be achieved. The steps of forming the patterned touch sensing film layer 140 (and the peripheral wiring 150) are simplified, the reaction solvents are saved, and the cost is reduced.

Figure 1F:
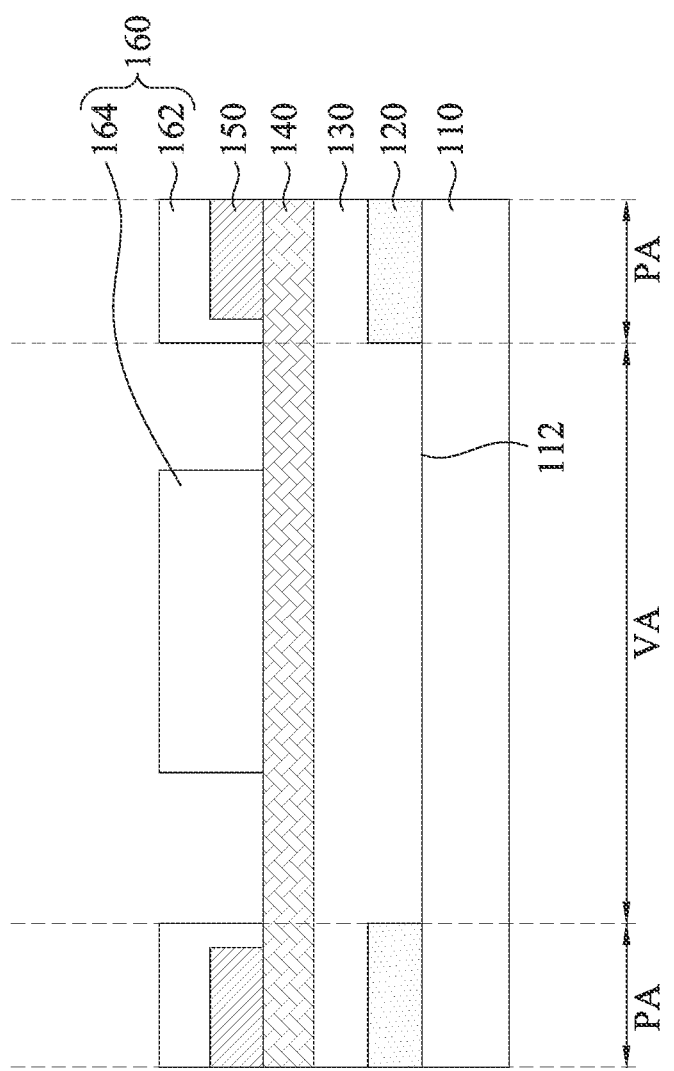

Please refer to FIG. 1F. A transparent insulating layer 160 is then formed on the patterned touch sensing film layer 140. A first portion 162 of the transparent insulating layer 160 is disposed on the peripheral wiring 150 and extends to cover side surfaces of the peripheral wiring 150. A second portion 164 of the transparent insulating layer 160 is disposed on the first surface 112 of the transparent cover 110 in the visible area VA. In some embodiments, the transparent insulating layer 160 may include an insulation material, such as silicon dioxide or a photoresist (for example, polyimide). In some embodiments, the transparent insulating layer 160 is a photoresist, which can be exposed to form a specific pattern corresponding to positions of the peripheral wiring 150 and a jumper 170 subsequently formed (please refer to FIG. 1G and FIG. 1H).

In some embodiments, a thickness of the transparent insulating layer 160 is less than 15 μm, for example, from 0.5 μm to 8 μm. For example, the thickness of the transparent insulating layer 160 may be 0.5 μm, 0.6 μm, 0.7 μm, 0.8 μm, 0.9 μm, 1 μm, 2 μm, 3 μm, 4 μm, 5 μm, 6 μm, 7 μm, 8 μm, or a value within any interval defined by the above values.

Figure 1G:
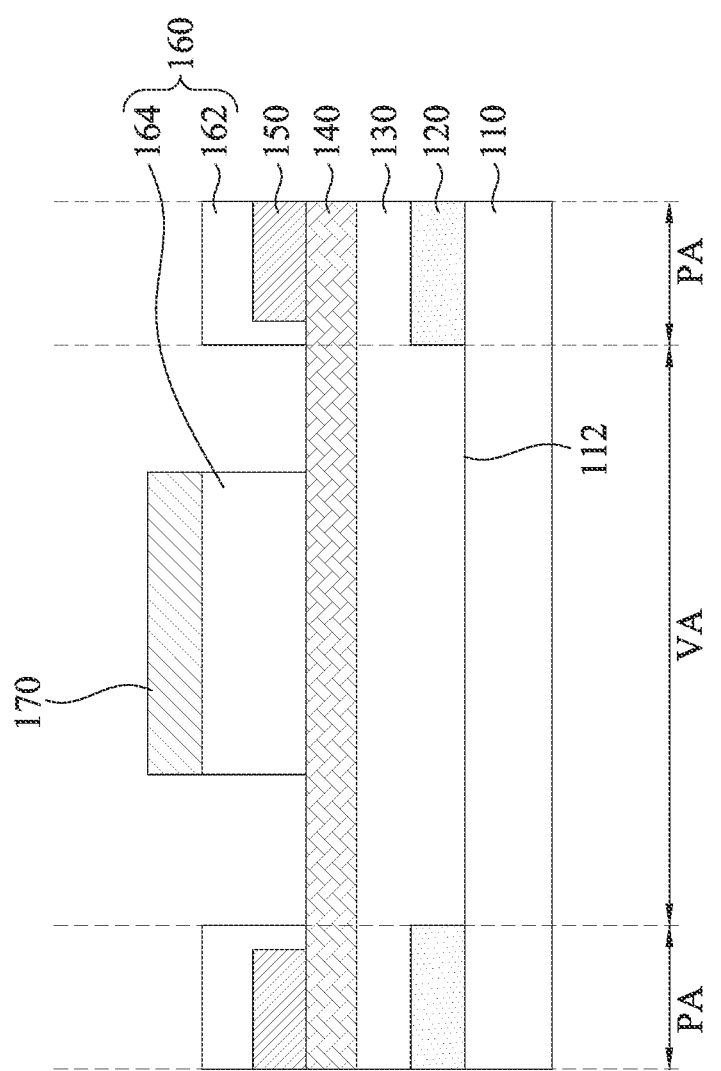

Please refer to FIG. 1G. Next, the jumper 170 is formed on the second portion of the transparent insulating layer 160 (for the function and position of the jumper 170, please refer to FIG. 1I for assistance).

In some embodiments, the jumper 170 may be made of a same or similar material to the patterned touch sensing film layer 140, and a description in this regard is not repeated here. However, it should be noted that in the step of forming the jumper 170, laser processing may be avoided. The reason lies in that a portion of the patterned touch sensing film layer 140 is exposed when the jumper 170 is formed. If a laser is used to laser a jumper material into the jumper 170, there is a risk of damaging the patterned touch sensing film layer 140 below.

In some embodiments, a thickness of the jumper 170 is less than 15 μm, for example, from 0.01 μm to 1 μm. For example, the thickness of the jumper 170 may be 0.1 μm, 0.2 μm, 0.3 μm, 0.4 μm, 0.5 μm, 0.6 μm, 0.7 μm, 0.8 μm, 0.9 μm, 1 μm, or a value within any interval defined by the above values.

Figure 1H:
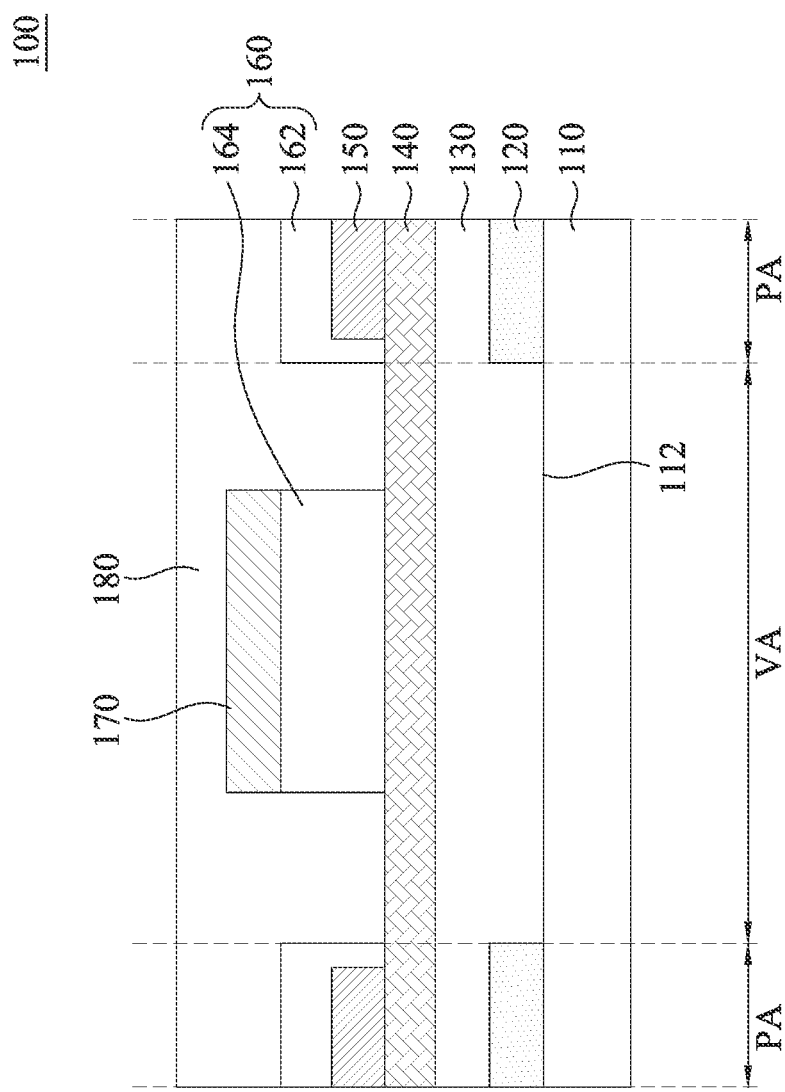
Figure 11:
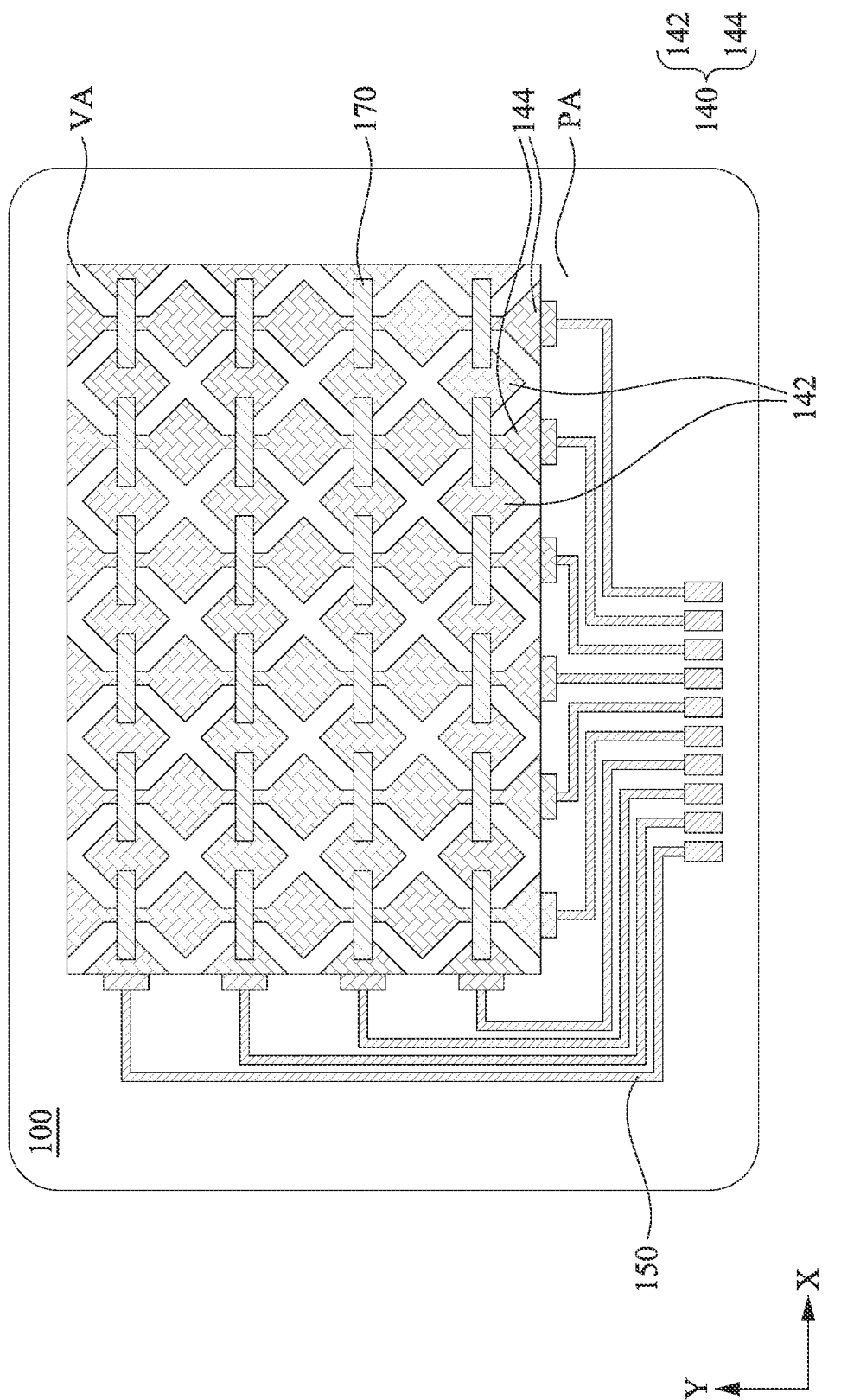
FIG. 11 schematically depicts a top view of a touch display device according to some embodiments of the present disclosure.

Please refer to FIG. 1H. A protective layer 180 is thereafter disposed on the transparent insulating layer 160, the jumper 170, and the patterned touch sensing film layer 140 to form the touch display device 100.

In some embodiments, the protective layer 180 is an insulation material and may be formed by a printing method.

In some embodiments, a thickness of the protective layer 180 is less than 15 μm, for example, from 0.5 μm to 10 μm. For example, the thickness of the protective layer 180 may be 0.5 μm, 0.6 μm, 0.7 μm, 0.8 μm, 0.9 μm, 1 μm, 2 μm, 3 μm, 4 μm, 5 μm, 6 μm, 7 μm, 8 μm, 9 μm, 10 μm, or a value within any interval defined by the above values.

FIG. 1I depicts a top view of the touch display device 100 according to some embodiments of the present disclosure. FIG. 1I depicts relative positions of the patterned touch sensing film layer 140, the peripheral wiring 150, and the jumper 170 in the touch display device 100. The patterned touch sensing film layer 140 includes a plurality of horizontal electrode lines 142 (extending in the X-axis direction) and a plurality of vertical electrode lines 144 (extending in the Y-axis direction). Each of the horizontal electrode lines 142 and each of the vertical electrode lines 144 are respectively formed by connecting a plurality of electrode units. The jumper 170 is connected to the horizontal electrode lines 142, and a transparent insulating layer (not shown in the figure) is used to prevent the horizontal electrode lines 142 from contacting the vertical electrode lines 144.

FIG. 2A to FIG. 2F schematically depict cross-sectional diagrams of forming a touch display device 200 at various process stages according to some other embodiments of the present disclosure. The steps and materials of FIG. 2A to FIG. 2F are considerably similar to those of FIG. 1C to FIG. 1H. The difference lies in that a UV-blocking layer 230 in FIG. 2A only covers a light-shielding layer 220, and the UV-blocking layer 230 is not limited to a transparent material.

Figure 2A:
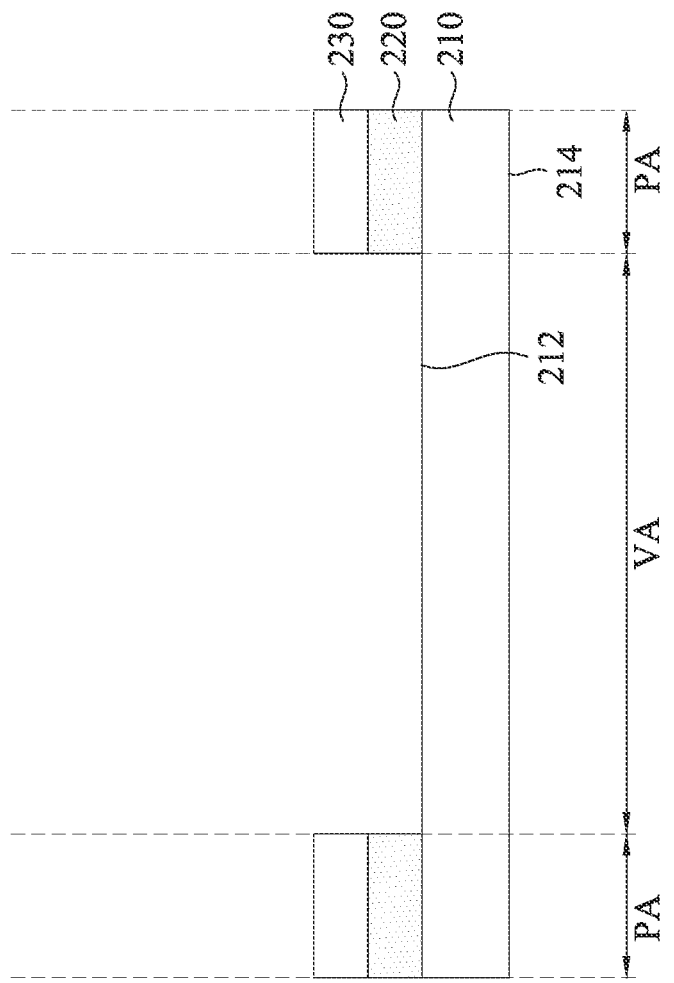
FIG. 2A to FIG. 2F schematically depict cross-sectional diagrams of forming a touch display device at various process stages according to some other embodiments of the present disclosure.

Please refer to FIG. 2A. First, a transparent cover 210 and the light-shielding layer 220 disposed on a first surface 212 of the transparent cover 210 are sequentially formed by using the same or similar materials and steps as those of FIG. 1A and FIG. 1B. The light-shielding layer 220 defines a visible area VA and a peripheral area PA. The UV-blocking layer 230 is then disposed on the light-shielding layer 220. The UV-blocking layer 230 only covers the light-shielding layer 220 and does not extend to the visible area VA. That is to say, a position projected by the UV-blocking layer 230 on the transparent cover 210 along the Z-axis direction (a vertical direction) covers the light-shielding layer 220, and a projection area of the UV-blocking layer 230 is completely within the peripheral area PA. It can be understood that the UV-blocking layer 230 can be made of a transparent material or an opaque material, such as a transparent ink, a gray ink, a transparent photoresist (for example, polyimide), or an opaque photoresist, because the UV-blocking layer 230 is not exposed in the visible area VA.

Figure 2B:
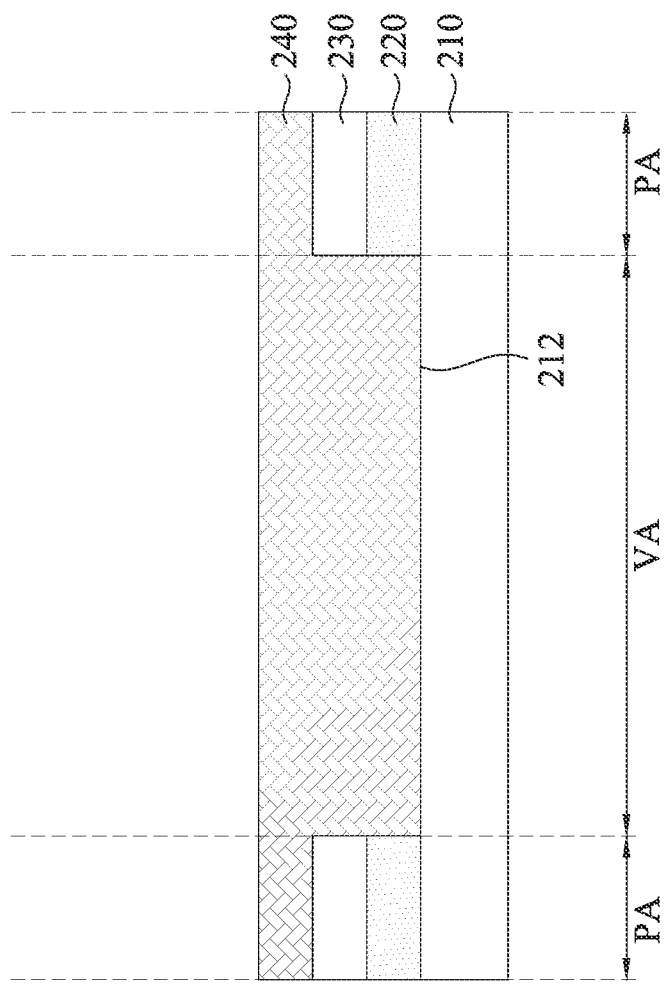
Figure 2C:
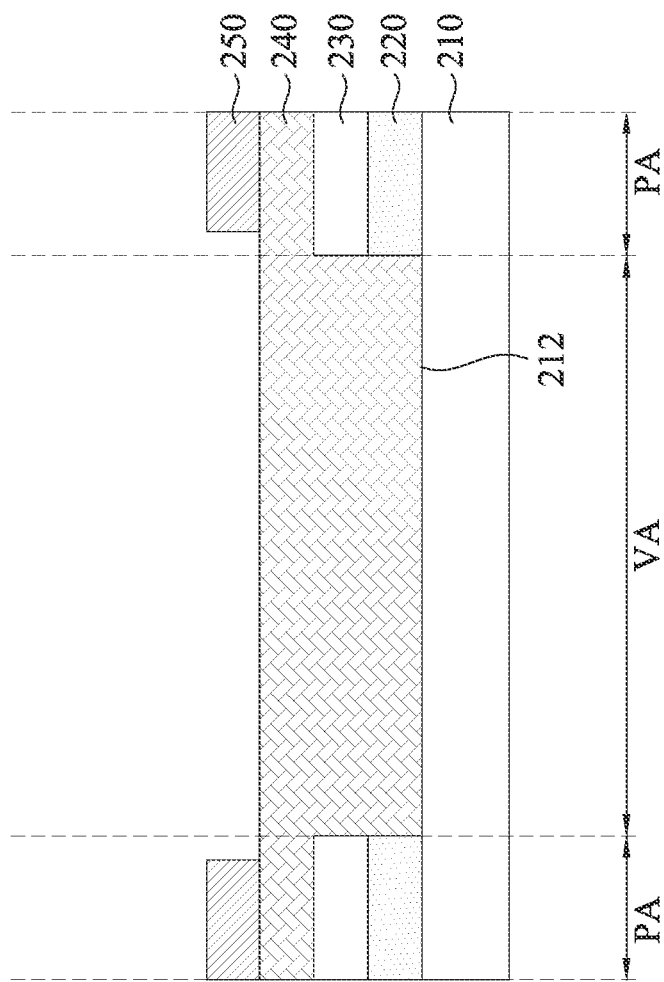
Figure 2D:
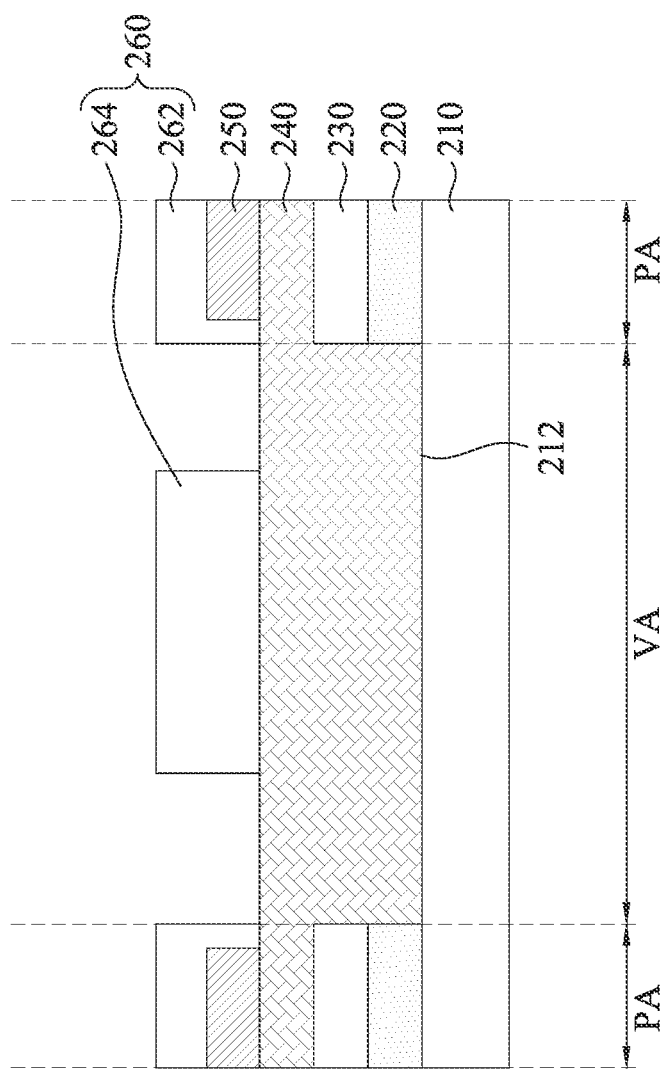
Figure 2E:
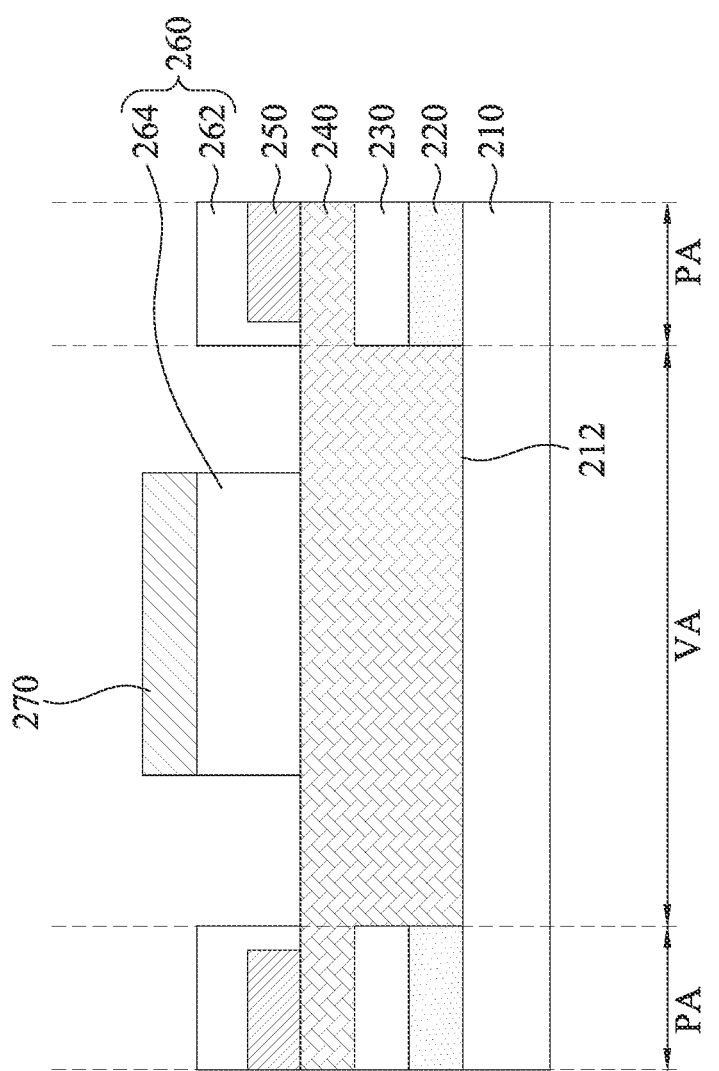
Figure 2F:
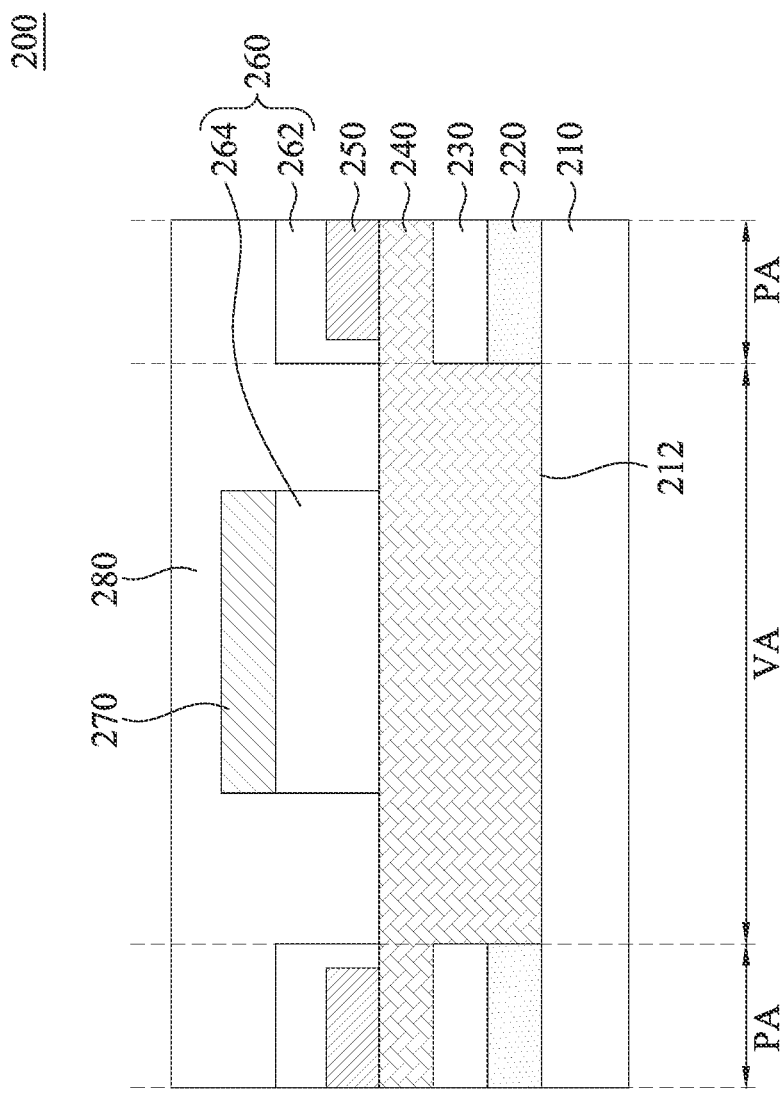

Please refer to FIG. 2B. A patterned touch sensing film layer 240 is then formed on the UV-blocking layer 230 and the first surface 212 of the transparent cover 210 in the visible area VA. That is, as compared with the patterned touch sensing film layer 140 of FIG. 1D that covers and directly contacts the UV-blocking layer 130 in the visible area VA and the peripheral area PA, the patterned touch sensing film layer 240 of FIG. 2B covers and directly contacts the UV-blocking layer 230 (in the peripheral area PA) and the first surface 212 of the transparent cover 210 (in the visible area VA).

The steps and materials in FIG. 2C, FIG. 2D, FIG. 2E, and FIG. 2F are the same as or similar to those in FIG. 1E, FIG. 1F, FIG. 1G, and FIG. 1H, respectively. Finally, the touch display device 200 is formed in FIG. 2F.

FIG. 3A to FIG. 3F schematically depict cross-sectional diagrams of forming a touch display device 300 at various process stages according to some other embodiments of the present disclosure. The materials and relative positions of elements of FIG. 3A to FIG. 3F are considerably similar to those of FIG. 1B to FIG. 1H. The difference lies in that in FIG. 3A to FIG. 3F, a jumper 370 is first formed on a first surface 312 of a transparent cover 310 in a visible area VA, then a UV-blocking layer 330 made of a transparent insulation material is used to cover the jumper 370 and a light-shielding layer 320 (that is, the UV-blocking layer 330 covers tops of the jumper 370 and the light-shielding layer 320 and extends to cover side surfaces of the jumper 370 and the light-shielding layer 320), and then a patterned touch sensing film layer 340 is successively formed. The disposition of FIG. 1B to FIG. 1H is as follows. The patterned touch sensing film layer 140 is first formed, then the transparent insulating layer 160 and the jumper 170 are sequentially formed on the patterned touch sensing film layer 140, and an intersection of the patterned touch sensing film layer 140 and the jumper 170 is isolated by the transparent insulating layer 160.

That is to say, in the touch display device 300 formed by FIG. 3A to FIG. 3F, the UV-blocking layer 330 not only can be used for blocking ultraviolet light, but also has an effect of the transparent insulating layer 160 in FIG. 1H. That is, the effect of isolating the patterned touch sensing film layer 140 and the jumper 170. In addition to that, the jumper 370 is located under the patterned touch sensing film layer 340 or is coplanar with the patterned touch sensing film layer 340 in the Z-axis direction (a vertical direction) and is not located above the patterned touch sensing film layer 140, like the jumper 170 of the touch display device 100 in FIG. 1H does.

Figure 3A:
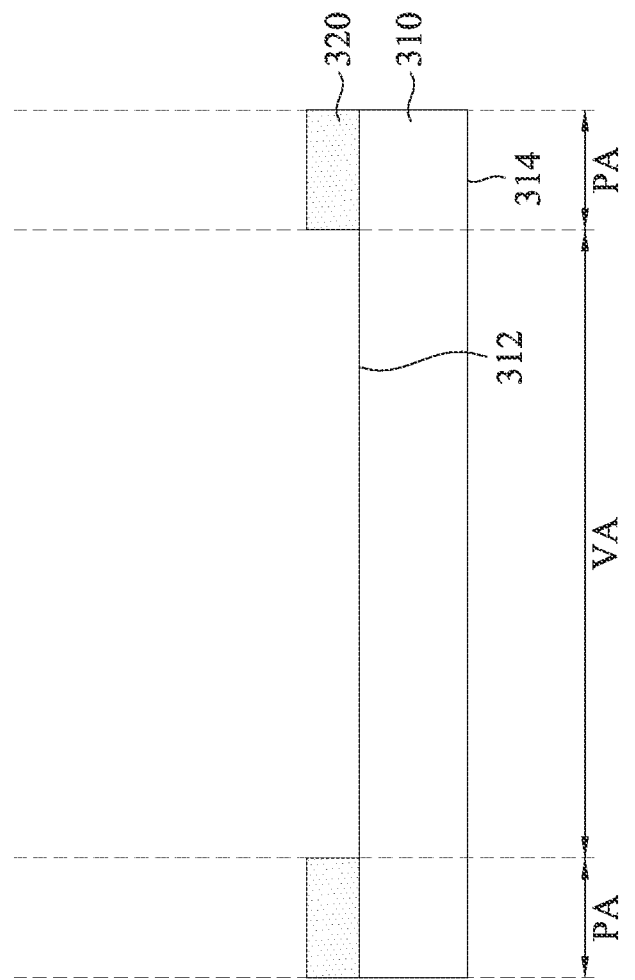
FIG. 3A to FIG. 3F schematically depict cross-sectional diagrams of forming a touch display device at various process stages according to some other embodiments of the present disclosure.

Please refer to FIG. 3A. The transparent cover 310 and the light-shielding layer 320 disposed on the first surface 312 of the transparent cover 310 are sequentially formed by using the same or similar materials and steps as those of FIG. 1A and FIG. 1B. The light-shielding layer 320 defines the visible area VA and a peripheral area PA.

Figure 3B:
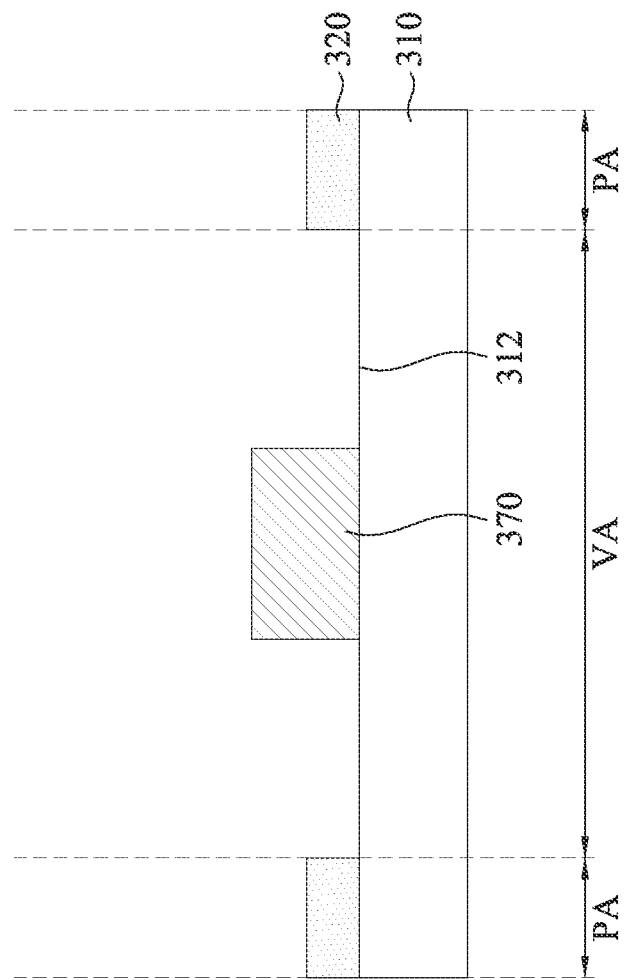

After that, as shown in FIG. 3B, the jumper 370 is disposed on the transparent cover 310 in the visible area VA.

Figure 3C:
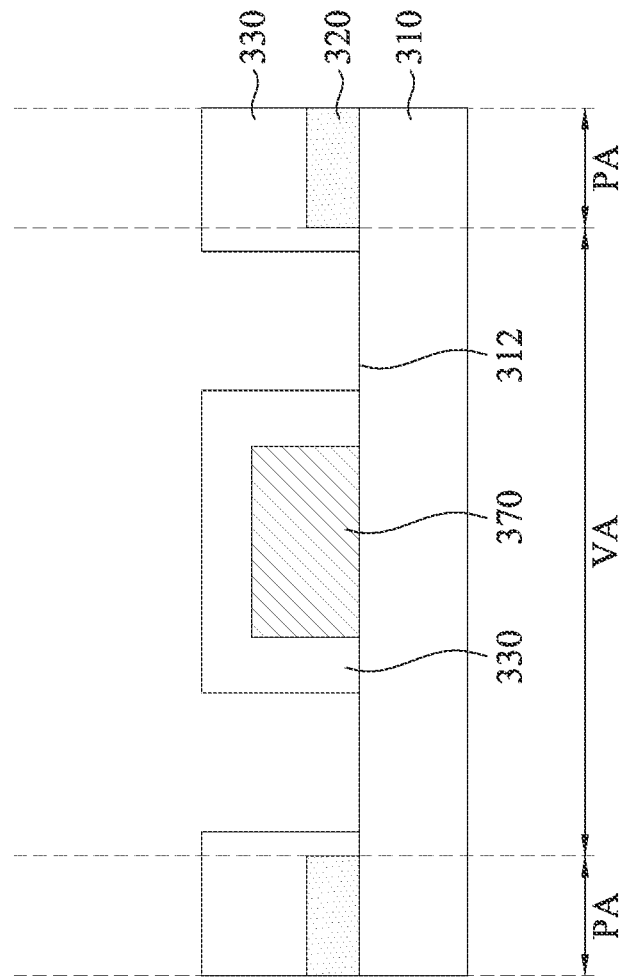

Please refer to FIG. 3C. The UV-blocking layer 330 is then disposed on the light-shielding layer 320, and the UV-blocking layer 330 covers the jumper 370 (that is, the UV-blocking layer 330 covers the tops of the jumper 370 and the light-shielding layer 320 and extends to cover the side surfaces of the jumper 370 and the light-shielding layer 320). The UV-blocking layer 330 is the transparent insulation material. In some embodiments, the UV-blocking layer 330 needs to be formed corresponding to a position and a pattern of the jumper 370 to cover the jumper 370. Therefore, the UV-blocking layer 330 can be a photoresist, and a position and thus a formed pattern of the UV-blocking layer 330 can be adjusted by designing a photomask. In one embodiment, photoresist liquid can be first coated on the light-shielding layer 320 and the jumper 370, then a light having a wavelength greater than 400 nm (for example, a wavelength of 405 nm or 436 nm) is used to expose the photoresist liquid to harden the photoresist liquid so as to form the UV-blocking layer 330, which blocks ultraviolet irradiation. It can be understood that a material of the UV-blocking layer 330 is not only a general photoresist material but also a material having the property of blocking ultraviolet irradiation after exposure and hardening. In one embodiment, the UV-blocking layer 330 may include polyimide.

Figure 3D:
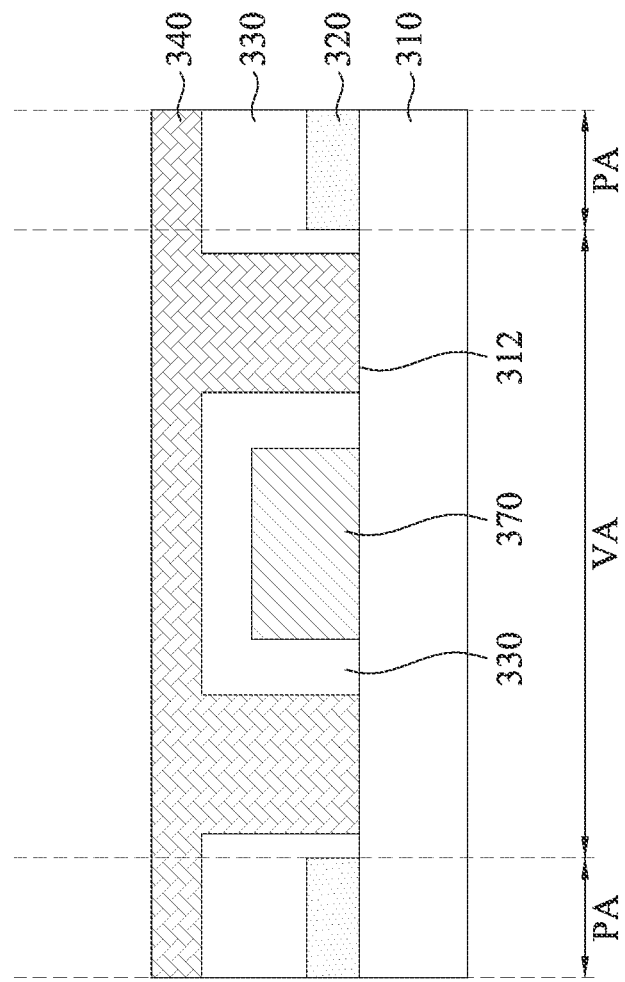

Please refer to FIG. 3D. The patterned touch sensing film layer 340 is thereafter formed on the UV-blocking layer 330 and the first surface 312 of the transparent cover 310. The patterned touch sensing film layer 340 covers the UV-blocking layer 330 and extends to cover a portion of the first surface 312 to separate the UV-blocking layer 330 on the jumper 370 and the UV-blocking layer 330 on the light-shielding layer 320.

Figure 3E:
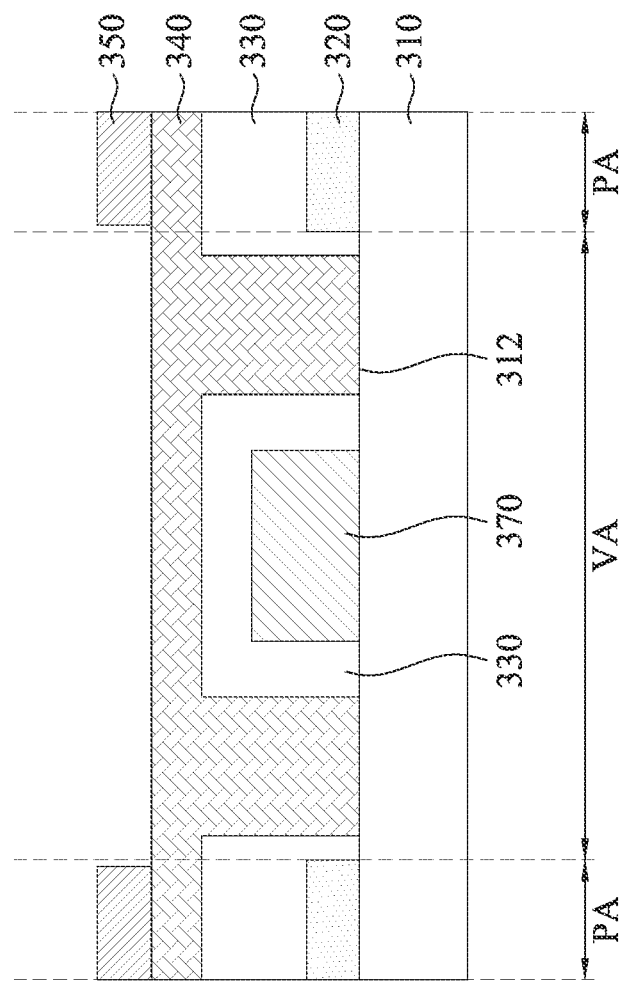

Please refer to FIG. 3E. A peripheral wiring 350 is then formed on the patterned touch sensing film layer 340 in the peripheral area PA, similar to the step of FIG. 1E.

Figure 3F:
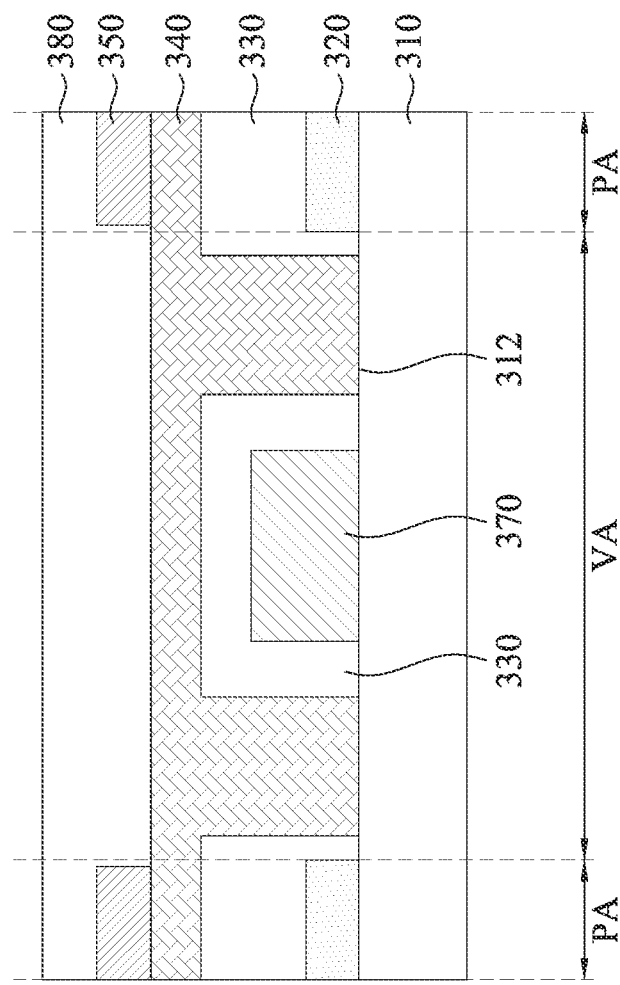

Please refer to FIG. 3F. A protective layer 380 is then disposed on the peripheral wiring 350 and the patterned touch sensing film layer 340 to form the touch display device 300.

In some embodiments, the touch display device can be further assembled with some other electronic component(s) to form an electronic device, including but not limited to a mobile device (a mobile phone, a tablet computer, or a notebook computer), a wearable device (a smart watch, smart glasses, smart clothing, or smart shoes), and a vehicle device (a dashboard, a dashcam, a rear view mirror, a car window, or a car door).

In summary, some embodiments of the present disclosure provide the touch display device and the formation thereof that can prevent a laser from damaging the light-shielding layer through the disposition of the UV-blocking layer to achieve the step improvement of replacing the wet etching step of the related art with laser-etching in the single-side electrode structure. The steps of forming the patterned touch sensing film layer (that is, the electrode circuit (such as the horizontal electrode lines and the vertical electrode lines)) are simplified, the reaction solvents are saved, and the cost is reduced.

Although the present disclosure has been described in considerable detail with reference to certain embodiments thereof, other embodiments are possible. Therefore, the spirit and scope of the appended claims should not be limited to the description of the embodiments contained herein.

What is claimed is:

1. A touch display device comprising:
a transparent cover comprising a first surface and a second surface opposite to the first surface;
a patterned touch sensing film layer covering the first surface of the transparent cover;
a light-shielding layer disposed on a portion of the first surface of the transparent cover and located between the transparent cover and the patterned touch sensing film layer, wherein an area projected by the light-shielding layer on the transparent cover along a vertical direction defines a peripheral area, and another area on the transparent cover adjacent to the peripheral area is defined as a visible area;
a jumper disposed on a second portion of the first surface of the transparent cover and located between the transparent cover and the patterned touch sensing film layer, wherein the jumper is disposed in the visible area; and
an ultraviolet-blocking (UV-blocking) layer preventing ultraviolet light from irradiating the light-shielding layer and having a property for blocking ultraviolet irradiation after exposure, wherein the UV-blocking layer is located between the light-shielding layer and the patterned touch sensing film layer and covers the light-shielding layer, the UV-blocking layer is further located between the jumper and the patterned touch sensing film layer and covers the jumper, the UV-blocking layer is a transparent insulation material, and a sidewall of the patterned touch sensing film layer is spaced apart from a sidewall of the light-shielding layer by the UV-blocking layer.

2. The touch display device of claim 1, wherein the UV-blocking layer covers the light-shielding layer and extends to cover a third portion the first surface in the visible area between the light-shielding layer and the jumper.

3. The touch display device of claim 1, wherein the UV-blocking layer contacts a sidewall of the jumper.

4. The touch display device of claim 1, further comprising a peripheral wiring disposed on the patterned touch sensing film layer, wherein a position projected by the peripheral wiring on the transparent cover along the vertical direction is located in the peripheral area.

5. The touch display device of claim 4, further comprising a protective layer disposed on the patterned touch sensing film layer and over the peripheral wiring.

6. The touch display device of claim 1, wherein the patterned touch sensing film layer covers the UV-blocking layer and extends to cover the portion of the first surface of the transparent cover to separate the UV-blocking layer on the jumper and the UV-blocking layer on the light-shielding layer.

7. The touch display device of claim 1, further comprising a protective layer disposed on the patterned touch sensing film layer.

8. The touch display device of claim 1, wherein a material of the UV-blocking layer is an ink or a photoresist.

9. The touch display device of claim 1, wherein the UV-blocking layer contacts the sidewall of the light-shielding layer.

10. The touch display device of claim 1, wherein the UV-blocking layer contacts a sidewall of the jumper.

11. The touch display device of claim 1, wherein the patterned touch sensing film layer is disposed laterally between the light-shielding layer and the jumper.

12. The touch display device of claim 1, wherein the patterned touch sensing film layer contacts the first surface of the transparent cover between the light-shielding layer and the jumper.

13. The touch display device of claim 1, wherein the UV-blocking layer surrounds at least three sides of the jumper.

14. A method of forming a touch display device comprising:
providing a transparent cover comprising a first surface and a second surface opposite to the first surface;
covering a light-shielding layer on a portion of the first surface of the transparent cover, wherein an area projected by the light-shielding layer on the transparent cover along a vertical direction defines a peripheral area, and another area on the transparent cover adjacent to the peripheral area is defined as a visible area;
disposing a jumper on the transparent cover in the visible area after the step of covering the light-shielding layer on the portion of the first surface of the transparent cover;
covering an ultraviolet-blocking (UV-blocking) layer on the light-shielding layer and on the jumper, the UV-blocking layer having a property for blocking ultraviolet irradiation after exposure, wherein the UV-blocking layer is a transparent insulation material;
forming a touch sensing film layer on the UV-blocking layer; and
using a laser to etch the touch sensing film layer into a patterned touch sensing film layer.

15. The method of claim 14, wherein the UV-blocking layer covers the light-shielding layer and extends to cover a second portion of the first surface in the visible area between the light-shielding layer and the jumper in the step of covering the UV-blocking layer on the light-shielding layer and on the jumper.

16. The method of claim 14, wherein forming the touch sensing film layer comprises forming the touch sensing film layer laterally between the light-shielding layer and the jumper.

17. The method of claim 14, wherein forming the UV-blocking layer comprises forming the UV-blocking layer laterally between the light-shielding layer and the jumper.

18. The method of claim 14, wherein forming the UV-blocking layer comprises forming the UV-blocking layer to contact a sidewall of the light-shielding layer and a sidewall of the jumper.

* * * * *